Figure 1:
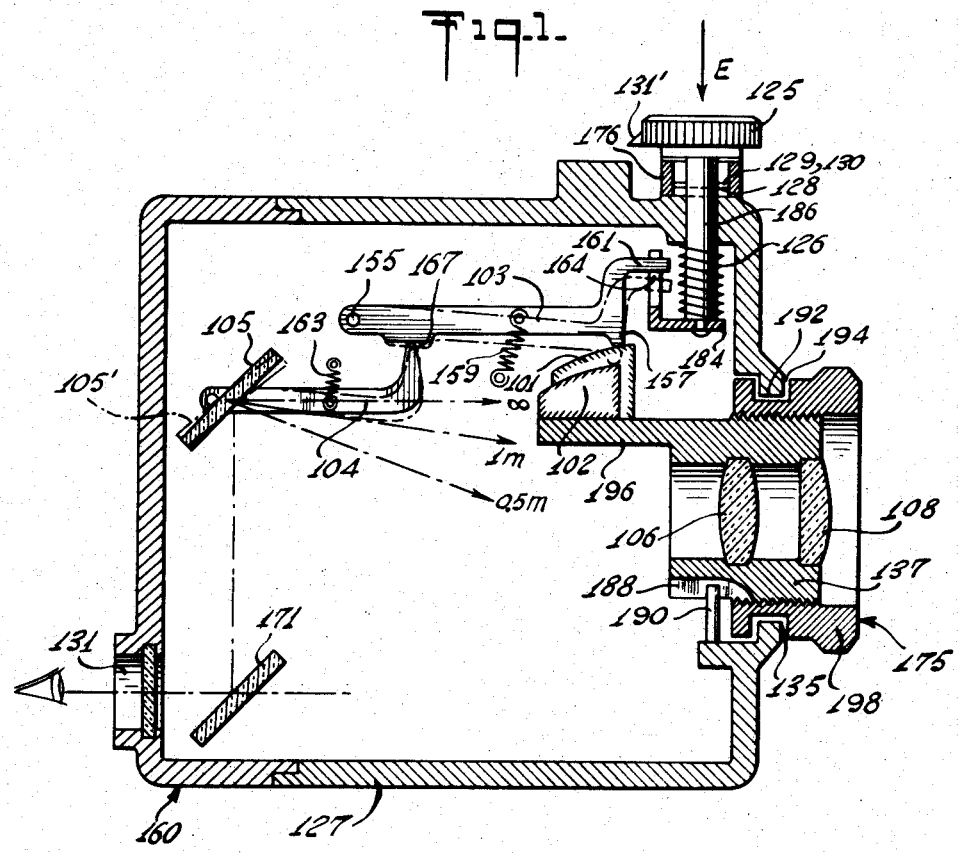

Oct. 3, 1961  W. HENNIG  3,002,439
CAMERA WITH COUPLED RANGE FINDER
Filed Sept. 12, 1956  2 Sheets-Sheet 1

INVENTOR
WALTER HENNIG
BY
ATTORNEYS

INVENTOR
WALTER HENNIG
BY
ATTORNEYS

United States Patent Office 3,002,439
Patented Oct. 3, 1961

3,002,439
CAMERA WITH COUPLED RANGE FINDER
Walter Hennig, Dresden, Germany, assignor to VEB Kamera- und Kinowerke Dresden
Filed Sept. 12, 1956, Ser. No. 609,407
3 Claims. (Cl. 95—44)

This invention relates to cameras and more particularly to a range finder camera, wherein a front lens attachment is detachably mounted on the objective of the camera for altering the distance range thereof.

The invention is concerned with a so-called coupled range finder arrangement, which is automatically adjusted in dependence on a focussing adjustment of the camera.

The inventive range finder arrangement may be used in many types of cameras, but may particularly advantageously be employed in cameras having a fixedly built-in objective.

For the purpose of focussing an object to be photographed, cameras may be adjusted by altering the distance between the objective and the film. This is accomplished by either axially displacing the objective relative to the film or vice versa. In cameras of compact construction the displacement of the objective and the film relative to one another is restricted within relatively narrow limits. The distance range which can be adjusted in such compact cameras is thus smaller than in cameras with track assembly or adjustable lazy tongs by means of which the distance between objective and film is adjustable within wider limits.

If it were desired to make such compact cameras adjustable for shooting at short distances as well, the thread on the objective for axially displacing the latter would have to be made extremely long or—in case the focussing is accomplished by moving the film portion behind the objective—this film portion would have to be displaceable within relatively wide limits. This in turn would affect the size of the camera. A folding camera for example would then be relatively bulky in closed condition, while the objective of a camera of the tube or barrel type would be considerably longer and larger. The advantage of a flat and compact camera casing or a handy-sized construction in general, which is the purpose of such cameras, would thus be lost.

With a view to overcoming the disadvantages referred to, it has been attempted to enlarge the distance range to include, for example, short distances in cameras by shortening the focal length of the objective. This is done by attaching to the objective a corresponding supplementary lens or front lens attachment. If, however, such an attachment is used on cameras having a so-called coupled range finder arrangement, it results in the disadvantage that the usual, built-in range finder arrangements are not matched to the lens system thus formed and thus do not serve their purpose any longer. It is thus necessary to employ special, additional range or view finder attachments which are mounted on the camera body when the front lens attachment is applied to the camera for varying the focussing range thereof. On the other hand, with a view to enabling the use of the built-in range and view finder arrangement of the camera, it has been proposed to attach to the objective front lens attachments of particular construction which correct the setting or adjusting movements of the coupled range and view finder corresponding to the altered distance range. Such supplementary devices or lenses, however, make the manipulation and handling of the camera cumbersome and complicated and result in considerably increased manufacturing costs. In case the optical, supplementary devices consist of a single lens which is common to the objective, the range finder and the view finder, these devices require considerable space whereby the use of the camera becomes cumbersome.

The invention aims at overcoming the drawbacks referred to and accordingly, it is an object of this invention to provide a coupled range finder arrangement for a camera making use of a front lens attachment, which enables adjustment of the range finder within a very wide distance range, including short distances, without the use of complicated optical auxiliary means.

A further object is the provision of a camera with a coupled range finder arrangement which may be focused to very far and very near objects and yet may have a casing of compact and handy size.

A still further object of the invention is the provision of a coupled view finder arrangement, i.e. an arrangement for compensating for the parallax error occurring during setting and viewing.

Yet another object is the combination of a range finder arrangement with a view finder arrangement, the latter being automatically adjusted jointly with the former.

It is also an object of the invention to provide a range finder arrangement and a view finder arrangement of simple construction which are inexpensive to manufacture and which are easily fitted into a camera.

Finally, it is an object of the invention generally to improve on the art of range and view finder arrangements as now customarily built.

In accordance with this invention, the adjustable distance range of the range finder of the camera is enlarged in a novel manner. The entire distance range, that is the distance range from "infinity" to say 0.5 meter or less, is subdivided into at least two distinct zones, one for the far distance range, the other for the near distance range. The additional deviation of the projection of the adjustable image (deviation of the measuring ray) required for the near distance range of the range finder, is accomplished by mechanical but not optical means. These mechanical means are preferably permanently connected with the camera and—if so desired—may also control an additional parallax error compensation of the view finder for the near distance range. These mechanical means render it possible to switch the range finder and view finder at will from one distance range zone to the other, whereafter fine adjustment within the respective zone may be effected. The invention permits the adjustment of the range finder to short distances as well as to long distances.

Figure 1A:
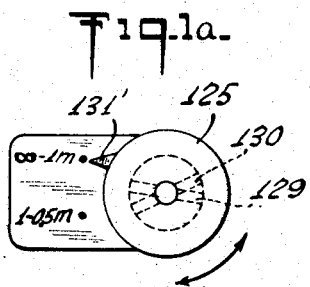
Figure 2:
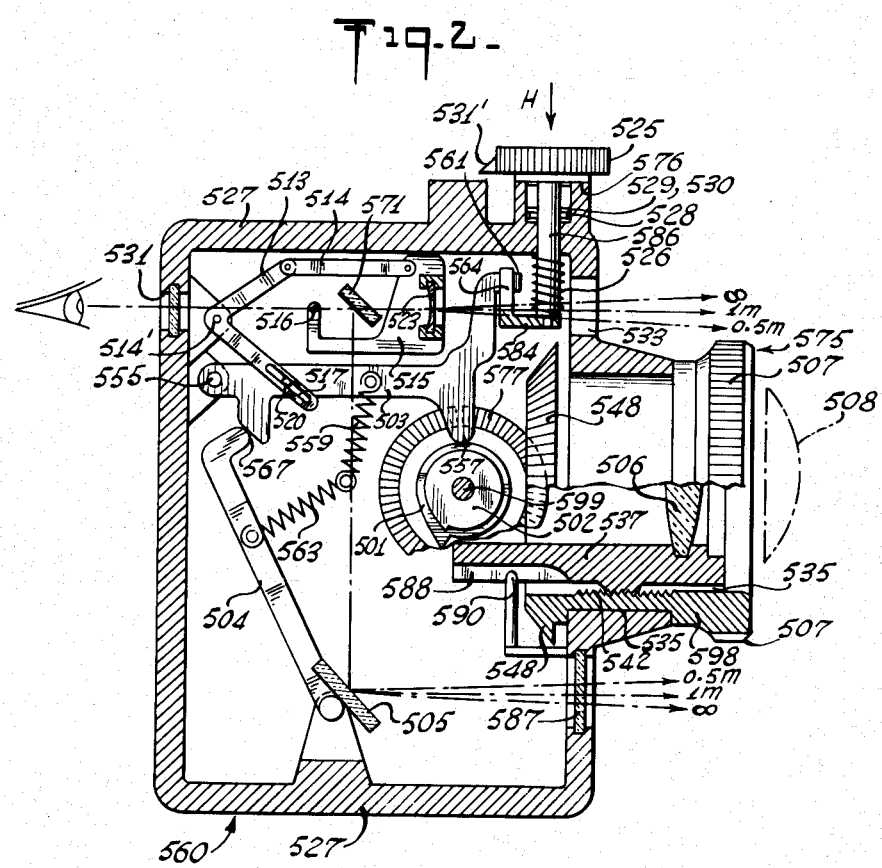
Figure 2A:
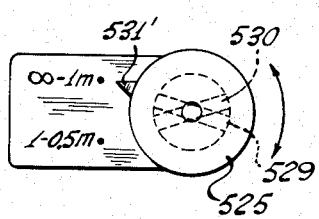

Other objects and structural details of the invention will be apparent from the following description when read in conjunction with the accompanying drawings, forming part of this specification, wherein:

FIG. 1 is a somewhat schematic, sectional view of a camera being fitted with a first embodiment of the inventive range finder arrangement, FIG. 1a is a fragmentary view of a detail of the camera shown in FIG. 1, seen in the direction of arrow E of FIG. 1, FIG. 2 is a sectional view of a camera featuring another embodiment of a coupled range and view finder arrangement, and FIG. 2a is a fragmentary view of a detail of the camera shown in FIG. 2, seen in the direction of arrow H of FIG. 2.

Referring now to the drawings and in particular to the embodiment shown in FIGS. 1 and 1a, reference numeral 160 generally indicates a camera having a coupled range finder arrangement constructed in accordance with the invention. The camera 160 is of the box type, i.e. it comprises a box or casing 127 having an opening 135 in which an objective generally indicated by 175 is mounted. Those parts of the camera 160 which have no bearing on the inventive range finder arrangement, for example the film holding and winding arrangement, have not been shown in the drawing. The casing 127 is provided with a front window (not shown) which is in register with a rear window 131. The objective 175 comprises an annular member 198 having a circumferential groove 194 into which projects a flange portion 192 of the casing 127. The annular member 198 is thus rotatable within the opening 135. A lens mount 137 is screwed into the annular member 198 and fitted with a lens 106. A front lens attachment diagrammatically indicated by a lens 108 shown in dash-and-dot lines may be attached to the lens mount 137. A pin 190 rigid with the casing 127 projects into a groove 188 of the lens mount 137. When the annular member 198 is turned, the lens mount 137—depending on the turning direction—will be axially displaced either to the right or the left (as seen in FIG. 1) since the pin 190 prevents rotation of the lens mount. The lens mount 137 is rigid with an extension 196 having cams 101 and 102 mounted thereon, one next to the other. One end of a shaped follower lever 103 is swingably mounted within the casing at 155. The mounting is constructed in such a manner that the lever 103 is capable of swinging about the pivot 155 both in vertical and somewhat in horizontal direction. A spring 159, one end of which is fixed to the lever 103 while the other end is secured within the casing 127, urges a projecting portion 157 of the lever 103 towards and into engagement with one of the cams. A light deflecting member 105, for example a mirror, is swingably mounted within the casing 127 and rigidly connected to one end of a swingable bent lever 104, the other end of which bears against an abutment surface 167 of the lever 103. A spring 163, one end of which is fixed within the casing 127 while the other end is secured to the bent lever 104, urges the latter into the engagement with the abutment surface 167. A front window (not shown) is provided in the casing 127 in register with the light deflecting member 105. A light reflecting member, for example a prism mirror 171 is mounted in the casing 127 in front of the window 131 in such a manner that light rays deflected by the light deflecting member 105 impinge on the prism mirror 171.

A pin 186 passes freely through a bore in the wall of the casing 127. A portion of the pin 186 projects from the casing and carries a knurled knob 125 which latter is rigid with an indicator nose 131. The indicator nose points towards a range scale provided on the outside of the casing 127. This can be seen in FIG. 1a which is a fragmentary view in the direction of arrow E of FIG. 1. A bent piece 184 is connected to the end of the pin 186 projecting into the interior of the casing 127. The bent piece 184 has a forked finger portion 164 between the fingers of which extends the free end 161 of the lever 103. A spring 126 is interposed between the piece 184 and the wall of the casing 127, said spring surrounding the pin 186. A sleeve 176 is rigid with the casing 127 and extends below the knob 125 which latter is urged against the top edge of the sleeve 176 by the spring 126. The sleeve surrounds the pin 186 outside the casing. Two crossing grooves 129 and 130 are provided in the bottom face of the sleeve 176 (see FIG. 1a). A peg 128 passing through a bore in the pin 186 in a direction perpendicular to the axis of the pin may be engaged with either of the grooves 129 or 130.

The rang finder arrangement of the camera here illustrated works as follows: The lever 103 is shown in full lines as bearing on the cam 101. In this position of the lever 103, i.e. the position in which the lever 103 engages the cam 101, the camera is set for picture taking at distances between "infinity" and 1 meter. For shooting pictures within this range, the lens 108 is removed. With a view to finely adjusting the objective 175 and thus the coupled range finder arrangement the annular member 198 is turned until the object to be photographed is sharply focussed. The turning of the annular member 198 results in axial displacement of the lens mount 137 and thus the cams 101 and 102, whereby the lever 103 is rocked in vertical direction about its mounting point 155. Th contact between the projecting portion 157 of the spring loaded lever 103 and the cam 101 is maintained all the time during the axial displacement of the objective 175 carrying the latter. The distance travelled by the cam 101 between its two extreme positions corresponds to a range adjustment from for example "infinity" to 1 meter. The rocking movement of the lever 103 caused by the displacement of the cam 101 results in turn in a swinging movement of the light deflecting member 105 through the bent lever 104 from the full line position into the position 105' shown in dash-and-dot lines. The outline of the cam 101 and the construction of the levers 103, 104 are chosen and adapted in such a manner, that the magnitude of the swinging movement of the light deflecting member 105 is matched to the displacement of the lens mount of the objective 175 and thus the displacement of the cam 101.

When the camera is to be adjusted for shooting pictures at distances less than 1 meter, the lever 103 is shifted so as to bear against the cam 102. The shifting of the lever 103 is accomplished in the following manner: The knob 125 with its pin 186 is lifted against the force of the spring 126 whereby the peg 128 is disengaged from the groove 129. Then the knob 125 is turned counterclockwise (as viewed in FIG. 1a), whereby a finger of the forked finger portion 164 is urged against the lever 103 for shifting same slightly in horizontal direction about its mounting point 155. Then the spring 159 urges the lever downwardly for engagement with the lower cam 102. Upon a release of the knob 125, the spring 126 draws the knob 125 and its pin 186 inwardly, whereby the peg 128 comes into engagement with the groove 130. The total focal length of the objective 175 is shortened by the attachment of a supplementary lens 108. Now the camera may be used for taking pictures at a distance between 1 meter and .5 meter. During a fine adjustment of the camera within said range, the lever 103 is in engagement with the cam 102. If, for example, the objective and range finder are adjusted for taking a picture at a 1 meter distance and the lever 103 is in engagement with the cam 102, the levers 103 and 104 are in the dash-and-dot line positions shown in FIG. 1. If the camera shall be used again for taking pictures within the range of 1 meter to "infinity," the supplementary lens 108 is removed and the lever 103 is reengaged by reversed operations of the knob 125.

Although the camera illustrated in FIGS. 1 and 1a has been embodied as being of the box type, it will be realized that the inventive range finder arrangement of above described construction can be used in other types of camera as well.

The embodiment illustrated in FIGS. 1 and 1a may also be provided with means dependent on the relative position of the range finder for automatically compensating for the parallax occurring in the view finder of the camera when the distance range is altered. The construction of such means will be described later on in connection with another embodiment of the range finder, shown in FIGS. 2 and 2a.

Many alterations may be effected in the construction of the embodiment of FIGS. 1 and 1a, with a view to adapting the adjusting means to different types of cameras.

For example, it is not necessary to secure the cams on the objective and to arrange the arm or lever 103 so that one of its pointed ends bears thereagainst. It is equally feasible to reverse the arrangement, so that the cams are arranged on a lever while the objective mount is provided with a pointed member or the like adapted to bear on the cams. The shifting to the respective cam determining the distance range to which the camera is adjusted, may in such case be accomplished either by a corresponding displacement of said pointed member into engagement with one of the cams or by displacing or adjusting the lever carrying the cams.

It will be understood that the cams employed in the inventive range finder arrangement need not be of the construction or shape as illustrated in the embodiment of FIGS. 1 and 1a. It is equally feasible to use cam discs.

An embodiment featuring a construction employing cam discs as controlling means is illustrated in FIGS. 2 and 2a. The camera 560 shown in FIG. 2 is in principle of the same construction as that shown in FIG. 1. It comprises a casing 527 having an opening 535 in which an objective generally indicated by 575 is mounted. The camera is provided with a front window 533 which is in register with a rear viewing window 531. The objective 575 comprises an annular member 598 rotatably and axially immovably mounted in the opening 535 of the casing 527. The outer end of the annular member 598 has a knurled flange 507 while the end inside the casing 527 is rigidly connected to a bevel gear 548. A portion of the inner surface of the annular member 598 is provided with a multiple thread 542 into which is screwed a lens mount 537. A lens 506 is fitted into the lens mount 537 while a supplementary lens or front lens attachment 508, shown in dash-dotted lines, may be detachably attached thereto. The portion of the lens mount 537 which projects into the interior of the camera is provided with a recess 588 into which projects a guide pin 590 rigidly secured to the camera casing 527. On turning the annular member 598, the lens mount is axially displaced, since the pin 590 prevents rotation thereof. A second bevel gear 577 is rotatably mounted within the casing 527 and meshes with the bevel gear 548. Two cam discs 501 and 502 are keyed to the shaft rigidly connected with bevel gear 577. One end of a shaped follower lever 503 is swingably mounted within the casing 527 at 555. The mounting 555 is constructed in such a manner that the lever 503 is capable of swinging about the mounting 555 both in vertical and somewhat in horizontal direction. A spring 559, one end of which is fixed to the lever 503 while the other end is secured within the casing, urges a projecting portion 557 of the lever 503 into engagement with one of the cam discs, for example with the cam disc 501 as shown in FIG. 2. A light deflecting member 505 is swingably mounted within the casing 527 and rigidly connected to a bent lever 504, the other end of which bears against an abutment surface 567 of the lever 503. A spring 563, one end of which is fixed within the casing 527 while the other end is secured to the bent lever 504, urges the latter into engagement with the abutment surface 567. A front window 587 is provided in the wall of the casing 527, in register with the light deflecting member 505. A light reflecting member 571 is mounted within the casing 527 between the windows 531 and 533 in such a manner that images coming through the window 587 are projected by the member 505 onto the member 571. The arrangement for shifting the lever 503 from the position shown in the drawing into a position in which the lever 503 engages the cam disc 502 is identical with that shown in FIG. 1. The function of the members 125, 126, 128, 129, 130, 131', 161, 164, 176, 184 and 186 of the embodiment of FIGS. 1 and 1a is thus taken over and performed by the corresponding members 525, 526, 528, 529, 530, 531, 561, 564, 576, 584 and 586 in the embodiment of FIGS. 2 and 2a.

FIG. 2a is a fragmentary view in the direction of arrow H of FIG. 2, illustrating the range scale on the camera casing 527.

The range finder arrangement illustrated in FIGS. 2 and 2a works in principle in the same manner as the arrangement of FIG. 1. Each of the two cam discs 501, 502 represents a distance range, for example cam disc 501 represents "infinity" to 1 meter and cam disc 502 1 meter to 0.5 meter. When the lever 503 is shifted into engagement with the respective cam disc, the camera after respective attachment or removal of the lens 508 is adjusted to the corresponding distance range. This is attained by the matched swinging movement of the light deflecting member 505 through the bent lever 504. The shifting of the lever 503 into its respective engagement with the cam discs is effected by lifting and turning the knob 525 in the same manner as described in connection with the embodiment of FIG. 1. The fine adjustment within both distance ranges is carried out by turning the ring 507 whereby the lens mount 537 is axially displaced to the desired extent while at the same time the meshing bevel gears 548, 577 and thus the cam discs are rotated. The levers 503 and 504 and with them the light deflecting member 505 are thus brought into the desired position.

The embodiment shown in FIGS. 2 and 2a is also provided with an arrangement for compensating parallax errors of the view finder. For this purpose, the following construction is provided. A bell crank lever 513 is swingably mounted at 514' within the casing 527. One of the arms of the bell crank lever 513 has a slot 517 into which projects a pin 520 secured to the lever 503. The other arm of the bell crank lever 513 is connected to one end of a rod 514, the other end of which is pivoted to a supporting member 515 which latter is rockably mounted within the casing at 516. A viewing member, for example a lens 523, is rigidly mounted on the supporting member 515. Through the rod 514 and the bell crank lever 513 with its slot 517, the viewing member 523 is operatively connected to the lever 503 so that a rocking of the latter causes a corresponding rocking movement of the supporting member 515 about the fulcrum 616 whereby the viewing axis is changed. The arrangement is dimensioned and adapted in such a manner that during a setting of the range finder from the far distance range (exemplified by the mark "∞") to the near distance range (shown at "0.5 m.") and vice versa the magnitude of the resulting displacement of the lens 523 is matched to the parallax error created by such a distance range adjustment.

Although the arrangement for the compensation of parallax error has been shown in the embodiment of FIG. 2 only, it is emphasized at this point that the previous embodiment described in this application, as well as other modified embodiments, may be fitted with such an arrangement in a corresponding manner.

It is also within the scope of this invention to couple the adjustment of the inventive range finder arrangement with an adjusting movement of the picture carrier and/or film guide instead of with an adjusting movement of the objective as described above. In other words, a coupled range finder according to the invention may be applied also to cameras wherein the objective retains its position and a film guide is adjusted relative to the objective for focusing the camera. In such a case the adjusting movement of the film guide is transmitted directly or indirectly to either the cam or cams or the lever engaging them, whereby corresponding adjustment of the range finder is obtained.

In case cam discs are employed as adjusting means, it is not necessary to transmit their rotational movement by a lever which bears on the circumference of the cam disc as shown. Different transmission means may be employed as well. It is for example feasible to arrange a pin on the follower lever which is guided in a corresponding slot of the cam disc. The follower lever carrying the pin should then be operatively associated with the range finder and—in case it is provided—the parallax compensation arrangement.

Furthermore, the cams or cam discs need not be actuated directly by the lens mount, as shown in FIG. 2. If desired, transmission means may be interposed between the lens mount and the cams or cam discs. Likewise, transmission means may be arranged between the pointed contact member or members and the lens mount.

Moreover, it is within the scope of the invention to replace the cams or cam discs by different means, for example a spindle or screw drive.

Since the various adjusting means may be adapted to different constructive requirements, it is possible to use the inventive arrangement in many types of camera, for example cameras having a stationary or movable tube-shaped objective mount as for example cameras of the type known in the trade as the "Leica"-type. Further, the inventive arrangement may be used in cinematographic cameras.

I have described preferred embodiments of my invention, but it is understood that this disclosure is by way of illustration rather than by way of limitation, and that various omissions and changes in shape, proportion and arrangements of parts, as well as substitution of equivalent elements for the arrangements shown and described may be made without departing from the spirit and scope of the invention as set forth in the appended claims.

What I claim is:

1. In a camera, the combination of a fixedly built-in-objective having a predetermined focal length for taking pictures within a first distance range, said objective including an adjustable lens mount for focusing the camera and gear means rotated simultaneously with the adjustment of said lens mount, front lens means detachably mounted on said objective for changing the focal length thereof for taking pictures within a second distance range, a range finder including displaceable light deflecting means, first controlling means comprising a pair of coaxial, rotatable cams operatively connected with said gear means of the objective, each of said cams corresponding to one of said first and second distance ranges, second controlling means comprising a pair of interacting levers, one of said levers cooperating with one of said cams of the controlling means while the other of said levers is operatively connected with said light deflecting means of the range finder for displacing same in dependence on an actuation of said first controlling means by said gear means of the objective, said second controlling means being selectively settable for cooperation with either of said cams so as to adapt the position of said light deflecting means to either one of said two distance ranges, and setting means comprising a pin loosely journaled in a wall of the camera, a knob for manual actuation at one end of said pin, a lateral finger portion on the other end of said pin for operatively engaging said one lever of the second controlling means, whereby the latter may be selectively brought into contact with the cam corresponding to the first distance range of the objective alone or with the cam corresponding to the second distance range in which the front lens means is attached to said objective.

2. In a camera having a fixedly built-in objective with a predetermined focal length for operation in a first distance range and means for focusing said objective: front lens means removably attachable to said objective for changing the focal length of the latter so as to render said objective operative in a second distance range, a range finder including pivotally adjustable means for deflecting one of the two light beams coming from an object visible through said range finder, mechanical means for coupling the path of said one light beam through said range finder in response to the operation of said focusing means in each of said distance ranges, said mechanical means comprising linkage means operatively connected to said deflecting means for pivotally adjusting the latter, a pair of cams, one corresponding to said first and the other to said second distance range, said cams being operatively interposed between said focusing means and said linkage means for controlling the actuation of the latter simultaneously with the operation of said focusing means, a view finder including pivotally adjustable light-deflecting means for the beam coming from an object visible through said view finder, said mechanical means also coupling said light deflecting means of said view finder to said focusing means for changing the path of said beam through said view finder in response to the operation of said focusing means in each of said distance ranges, and manual setting means for selectively moving the linkage means for engagement with one of said cams, said setting means comprising a pin traversing a wall of said camera for limited rotation therein and a knob at the outer end of said pin, said pin having a portion engaging said linkage means, whereby the operation of the focusing means will simultaneously control said deflecting means of the range finder and said light-deflecting means of said view finder, in accordance with the predetermined curvatures of said cams operative in the respective one of said distance ranges.

3. In a camera of the type having a fixedly built-in objective with a predetermined focal length for operation in a first distance range, focusing means for said objective, front lens means removably attached to said objective for changing the focal length of the latter so as to operate it in a second distance range, a coupled range-finder and view-finder arrangement comprising mirror means adjustable by controlling means including two movable cams operatively coupled to said focusing means, each of said cams corresponding to one of said distance ranges, the improvement which comprises two pivotally mounted, spring-biased levers, one of said levers sliding along the curvature of one of said cams and acting upon the other of said levers carrying one of said mirror means which effects the distance regulation of the range-finder, said one lever also acting upon linkage means pivoted to the second one of said mirror means which effects the parallax compensation of the view-finder, and setting means forming part of said coupled range-finder and view-finder arrangement, comprising a setting pin journaled in one of the camera walls, a forked portion on one end of said pin for operative engagement with a portion of said one lever and a control knob on the other end of said pin, outside the camera, adapted to select one of said distance ranges by urging said one lever against one or the other cam of said controlling means.

References Cited in the file of this patent

UNITED STATES PATENTS

| | | |
|---|---|---|
| 2,172,339 | Mihalyi | Sept. 5, 1939 |
| 2,191,281 | Leitz et al. | Feb. 20, 1940 |
| 2,220,021 | Ort | Oct. 29, 1940 |
| 2,261,421 | Steiner | Nov. 4, 1941 |
| 2,305,437 | Meyers et al. | Dec. 15, 1942 |
| 2,395,074 | Schwartz et al. | Feb. 19, 1946 |
| 2,526,522 | Wallendorf | Oct. 17, 1950 |
| 2,717,543 | McCathron | Sept. 13, 1955 |

FOREIGN PATENTS

| | | |
|---|---|---|
| 543,554 | France | Sept. 5, 1922 |
| 643,177 | Germany | Mar. 30, 1937 |
| 716,823 | Germany | Jan. 31, 1942 |
| 804,063 | Germany | Apr. 16, 1951 |
| 1,053,719 | France | Feb. 4, 1954 |
| 728,867 | Great Britain | Apr. 27, 1955 |
| 935,886 | Germany | Dec. 1, 1955 |
| 742,599 | Great Britain | Dec. 30, 1955 |